(12) United States Patent
Fischer

(10) Patent No.: US 6,762,852 B1
(45) Date of Patent: Jul. 13, 2004

(54) PRINT FEATURE SELECTION BASED ON COMBINED FEATURES OF SEVERAL PRINTERS

(75) Inventor: Todd A. Fischer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/413,013

(22) Filed: Oct. 5, 1999

(51) Int. Cl.[7] .......................... G06F 15/00; G06F 13/36; G06F 13/372

(52) U.S. Cl. .................... 358/1.15; 358/1.13; 358/1.14; 358/1.15; 710/113; 710/125

(58) Field of Search .............................. 358/1.14, 1.15, 358/1.13; 710/113, 125

(56) References Cited

U.S. PATENT DOCUMENTS 5,768,516 A  *  6/1998  Sugishima .................. 709/217
5,991,846 A  *  11/1999 Ooki .......................... 710/241
6,476,927 B1 *  11/2002 Schwarz, Jr. .............. 358/1.15

OTHER PUBLICATIONS

Novel Distributed Print Services, Web Pages, Aug. 4, 1999.

* cited by examiner

Primary Examiner—Kimberly A. Williams
Assistant Examiner—Saeid Ebrahimi

(57) ABSTRACT

A computer readable media for use with a computer, the computer readable media bearing software configured to present to a user of the computer an interface with which the user can select from a superset of print features provided by multiple printers; receive from the user data indicating print features selected by the user; and suggest a printer to the user based on print features selected by the user. A method of configuring a computer for printing, the method comprising presenting to a user an interface with which the user can select from a superset of print features provided by multiple printers; receiving from the user data indicating print features selected by the user; and suggesting a printer to the user based on print features selected by the user.

15 Claims, 2 Drawing Sheets

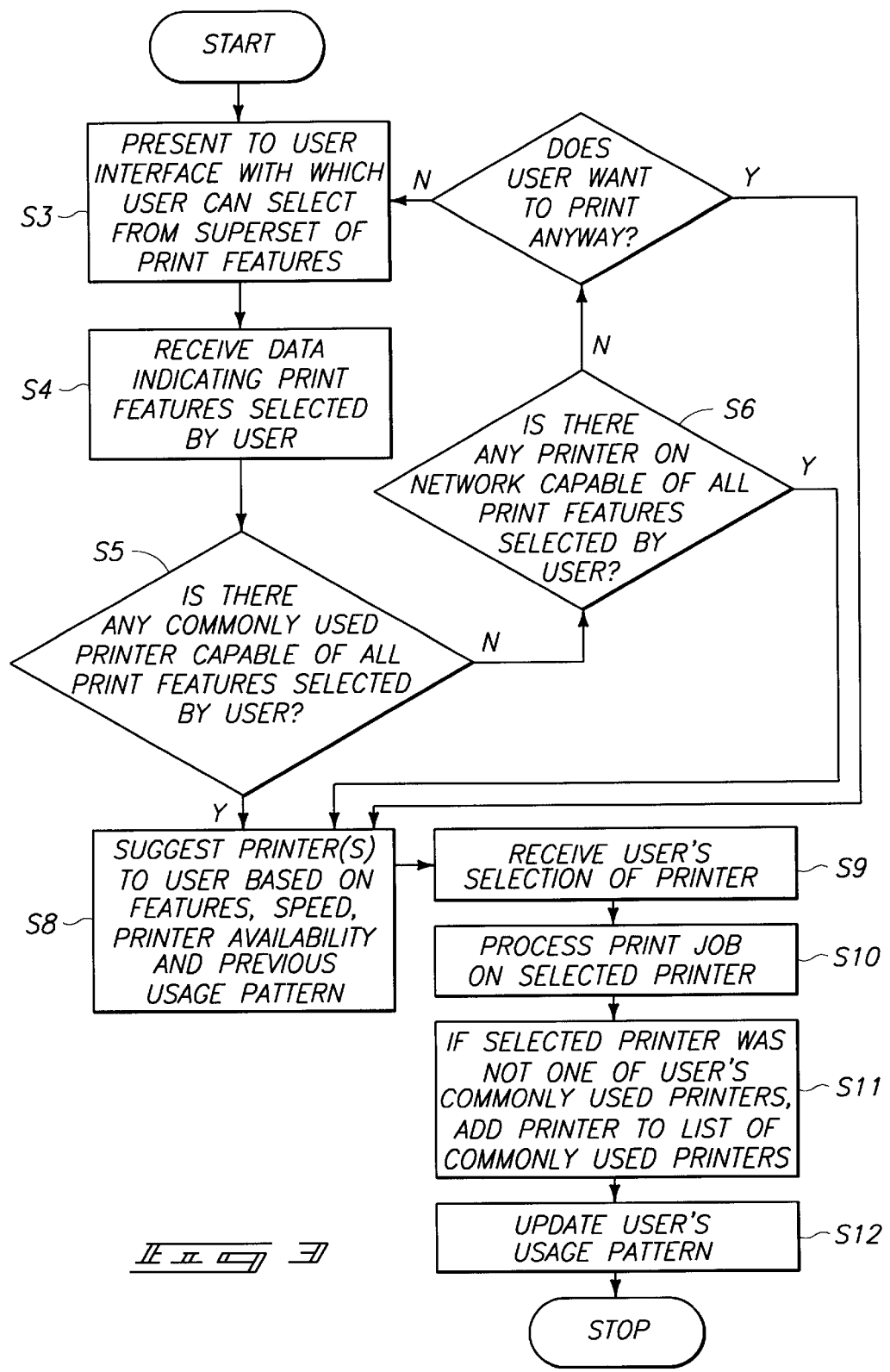

PRINT FEATURE SELECTION BASED ON COMBINED FEATURES OF SEVERAL PRINTERS

FIELD OF THE INVENTION

The invention relates to printers and computer networks. More particularly, the invention relates to selection of print features.

BACKGROUND OF THE INVENTION

Personal computers, networks, and printers are known in the art. A personal computer user wanting to print a document is presented with a dialog of various options available for the selected printer. A simple example is the number of copies to print. In fact, unknown to the user, many printer specific capabilities are presented in the process of generating a document to printer. For example, the user typically can only select paper sizes supported by the currently selected (often called default) printer. To pick a different paper size, the user typically has to first pick a different printer.

Presenting the user only with options supported by the selected printer has several disadvantages. First the user tends to be task oriented, thus wants to specify the task and have the system perform it. By forcing the user to understand the capabilities of each printer, so the user knows which one to select, is awkward for the user. For example, selecting DesignJet 650C before the user can select D size paper is not obvious. Second, the system can't add much value, like using a faster printer if the user's job is long. Finally, the system isn't learning about the user's preferences. The system is simply doing exactly what it is told. If the user described the task, and then corrected the system when the system guessed wrong, the system could remember the user's preference.

Attention is directed to a product called JetAdmin (TM). JetAdmin is a product available from the assignee of the present invention that enumerates all printers on a network.

Attention is also directed to a product called Novell Distributed Print Services (TM). Novell Distributed Print Services is software available from Novell that makes it easier for users to find a printer and to print from their workstations in large enterprise network environments. A user can view printers on the network, see each printer's job status, and send an urgent printing job to the printer with the smallest workload. Novell Distributed Print Services also enable users to choose customized printer configurations from their workstations to, for example, specify that a notification is desired if a printer is busy, a paper tray is empty, or a print job is finished.

These products fail to solve the problems identified above.

SUMMARY OF THE INVENTION

The invention provides a computer readable media for use with a computer, the computer readable media bearing software configured to present to a user of the computer an interface with which the user can select from a superset of print features provided by multiple printers; receive from the user data indicating print features selected by the user; and suggest a printer to the user based on print features selected by the user.

In one aspect of the invention, a method of configuring a computer for printing comprises presenting to a user an interface with which the user can select from a superset of print features provided by multiple printers; receiving from the user data indicating print features selected by the user; and suggesting a printer to the user based on print features selected by the user.

In another aspect of the invention, a computer configured for use in a network including multiple printers, some of which are commonly used by a user of the computer and contained in a list of printers stored in the computer, comprises software configured to:

(a) combine description files of printers to define a superset of print features provided by multiple printers on the network;

(b) present to a user an interface with which the user can select from the defined superset of print features provided by multiple printers on the network;

(c) receive from the user data indicating print features selected by the user;

(d) determine if there is any printer commonly used by the user capable of all of the print features selected by the user and, if so, proceed to step (f); and, if not, proceed to step (e);

(e) determine if there is any printer elsewhere in the network capable of all of the print features selected by the user and, if so, proceed to step (f) and, if not, providing a message so indicating to the user;

(f) suggest printers to the user capable of all the print features selected by the user;

(g) receive a selection of a printer from the user; and (h) send a print job for printing on the selected printer.

The set of printers the user typically uses can be called the commonly-used printers. The user is able to create a document and select printing features for the document based on any features supported by at least one of the commonly-used printers.

Specifically, in one embodiment, the set of description files characterizing the commonly-used printers are combined to create a new description file that contains a superset of capabilities supported by the commonly-used printers. There are several common formats for describing a printer's capabilities in a file. Adobe's Printer Description file (PPD) and Microsoft's Generic Printer Description file (GPD) are two examples. Other alternatives are possible.

For example, in one alternative embodiment, one or more of the printers are able to describe their features, and are interrogated directly if they can describe their features. More particularly, some printers have on-board MIBs (Management Information Base), one of which is a standard printer MIB, and the printer MIB is interrogated to determine the features of the printer using an appropriate protocol, such as SNMP (Simple Network Management Protocol).

In another alternative embodiment, information about a printer's features is obtained from a manufacturer's web site.

In addition, constraints can be included to keep the user from selecting features that are not possible. For example, if the user has a monochrome duplex printer and a color printer that only prints simplex, then the constraints would not allow the user to select automatic duplexing of a color document.

In an alternative embodiment, the approach to solving constraints is to check other printers the customer may find acceptable to use that supports the requested feature. In a large enterprise there may be a printer that meets the user's needs, but the user is unaware of the device and/or its capabilities. In this embodiment, the system adds the printer to the user's list of commonly used printers. This can occur, e.g., after prompting the user to determine if the user wants to add the printer to the user's list of commonly used printers.

Other features and advantages of the invention will become apparent to those of ordinary skill in the art upon review of the following detailed description, claims, and drawings.

DESCRIPTION OF THE DRAWINGS

FIG. 3 is a flowchart illustrating a print method in accordance with one aspect of the invention.

DETAILED DESCRIPTION OF THE INVENTION

Figure 1:
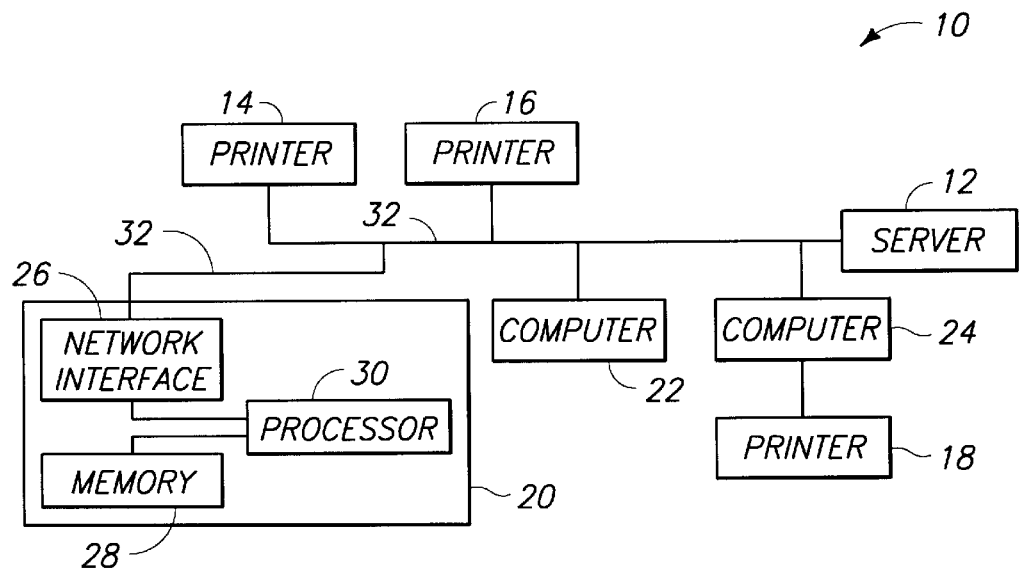
FIG. 1 is a block diagram of a computer network embodying one aspect of the invention.

FIG. 1 shows a computer network 10 embodying one aspect of the invention. The network 10 comprises a server 12, which can be a minicomputer, a microcomputer, a mainframe computer, a personal computer (PC), or any other appropriate server. In the illustrated embodiment, the server 12 runs a network operating system. More particularly, in the illustrated embodiment, the server 12 has a multi-user, multi-tasking operating system such as UNIX (TM), LINUX (TM), etc. or is a Novell (TM) or Microsoft NT (TM) server.

The network 10 further includes a plurality of printers 14, 16, 18, where at least some printers 14 and 16 are coupled to the server, e.g. via communications cable 32. The printers and server respectively include network interface hardware. The printers 14, 16, and 18 are different models and have different capabilities and features.

The network 10 further includes a plurality of user workstations or local computers coupled to the server 12 and to the printers 14, 16, 18, e.g., via communications cable 32. In the illustrated embodiment, the workstations comprise computers 20, 22, 24, such as personal computers. The computers respectively include network interface hardware 26.

The printer 18 is directly coupled to the computer 24. The computer 24 has software that allows server 12 and other computers 20, and 22 on the network to print to the printer 18 via the communications cable 32.

In one embodiment, the computers respectively include memory 28 or other computer readable medium bearing software that will be described below. In the illustrated embodiment, the memory 28 comprises a CD-ROM or disk, such as a hard disk or floppy disk, but the memory could alternatively be defined, at least in part, by one or more of the following: random access memory (RAM), read only memory (ROM), optical storage, floptical storage, tape storage, or any other appropriate data storage medium. The computers respectively have other typical components (not shown) such as a processor, input devices (e.g.; keyboard and mouse), output devices (e.g.; monitor, speaker), serial ports, parallel ports, communication hardware, etc. The computers 20 respectively further include a processor 30.

Figure 2:
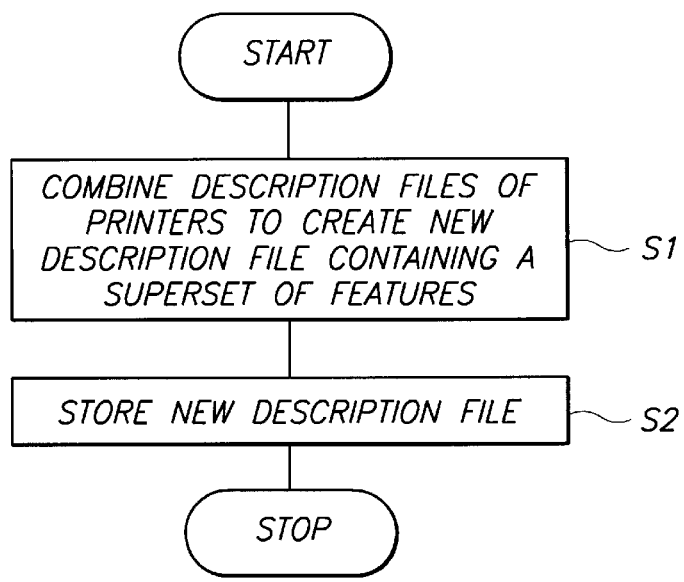
FIG. 2 is a flowchart illustrating a method in accordance with one aspect of the invention, performed in preparation for a method illustrated in FIG. 3.

FIG. 2 illustrates a software process that is performed before the process of FIG. 3 is performed.

At step S1, description files of printers are combined to create a new description file containing a superset of printer features or capabilities. The set of description files characterizing the commonly-used printers are combined to create a new description file containing a superset of capabilities of the set of the commonly-used printers. There are several common formats for describing a printer's capabilities in a file. Any appropriate description file format can be employed to create the new description file. Adobe's Printer Description file (PPD) and Microsoft's Generic Printer Description file (GPD) are two examples. The original description files are retained to be able to determine which printers are capable of all (or most) of the user's desired features.

At step S2, the new description file is stored.

In one embodiment, the steps S1 and S2 are repeated for multiple combinations of printers, e.g., for a user's commonly used printers as well as for all printers on the network or some other number of printers on the network. If they are performed for a user's commonly used printers, an additional step of determining what printers are commonly used by the user precedes step S1.

The process of FIG. 2 is a preparation or installation process that occurs prior to the process of FIG. 3. The process of FIG. 2 is performed by a workstation or user's computer 20, 22, 24, in the illustrated embodiment. In an alternative embodiment, it is at least partially performed by the server 12. For example, in one embodiment, the server 12 is an NT server that has description files for multiple printers on the network. When a printer is installed to a computer 20, 22, or 24, a description file for that printer is transferred from the server 12 to the computer 20, 22, or 24. The combination of description files can be carried out on either the server 12 or the local computer 20, 22, or 24, and the combined description file can be stored on either the server 12 or the local computer 20, 22, or 24. It is also possible to obtain printer feature information directly from the printer, from a manufacturer's web site, or from other sources instead of from the server.

The process of FIG. 3 occurs during printing from an application (e.g., after a Print or Print Setup selection is made).

The process of FIG. 3 is performed by a workstation or user's computer 20, 22, 24, in the illustrated embodiment. In an alternative embodiment, it is at least partially performed by the server 12.

At step S3, a computer presents to a user an interface with which the user can select from a superset of print features. After performing step S3, the computer proceeds to step S4.

At step S4, the computer receives data indicating print features selected by the user. These can be selected, for example, by a mouse or keyboard using pull down menus, radio buttons, tabs, dialog boxes, voice commands, etc. The selectable features can include, for example, number of copies, simplex or duplex, single sided or double sided, size of paper, paper tray, margins, portrait or landscape, number of columns, color or black and white, etc. After performing step S4, the computer proceeds to step S5.

At step S5, a determination is made as to whether there is any commonly used printer capable of all (or many) of the print features selected by the user. If so, the computer proceeds to step S8. If not, the computer proceeds to step S6.

At step S6, a determination is made as to whether there is any printer elsewhere on the network capable of all (or many) of the print features selected by the user. If so, the computer proceeds to step S8. If not, the computer proceeds to step S7.

At step S7, an error message or dialog is presented to the user in which the user is informed that there is no printer capable of all the print features selected by the user. In the illustrated embodiment, the user is prompted as to whether he/she wants to print anyway. If so, the computer proceeds to step S8. If not, in one embodiment, the user is then re-presented with the interface of step S3. In an alternative embodiment, the user must re-start the print process.

At step S8, the computer suggests printers to the user based on features and, in one embodiment, speed and/or location. For example, in one embodiment, the computer only presents a list of printers capable of all of the user's desired features and then suggests one or more based on speed and/or location of the printers, queue of jobs for the printers, printers being ready to print, and previous usage pattern. The fastest printer may not always be the best choice for a user. If a print job is short, speed of the printer may not be as big of a concern as distance to the user. If a faster printer has a long queue of jobs awaiting printing, a slower printer may be preferable. If a printer is out of paper, or has a paper jam, another printer may be preferable. In another embodiment, the computer presents a list of printers which are capable of the most of the desired features, or presents an indication of which printers are capable of which features. After performing step S8, the computer proceeds to step S9.

At step S9, the computer receives a user's selection of a printer. After performing step S9, the computer proceeds to step S10.

At step S10, the computer processes the print job on the selected printer. For example, the computer formats the print job for the selected printer and communicates with a print server (e.g., the server 12 or another server) or directly with the printer to initiate the print process. After performing step S10, the computer proceeds to step S11.

At step S11, which can occur at any time after step S8 (e.g., immediately after step S8 in one embodiment), if the selected printer was not one of the user's commonly used printers, the computer adds the printer to the list of commonly used printers. More particularly, in one embodiment, the user is first prompted as to whether he or she would like to add the selected printer to the list of commonly used printers and the computer adds the printer only if the user agrees. After performing step S11, the computer proceeds to step S12.

At step S12, the user's usage pattern is updated for use in step S8 in later print jobs. In one embodiment, the next time printers are suggested to the user in step S8, previously selected printers will be suggested for particular selected features. Further, a user's usage pattern is used, in one embodiment, to determine for what size of print job the user will prefer a fast computer to a closer computer for any particular set of selected features.

In a small organization, it may be assumed that all printers capable of performing the desired functions are located near the user, in which case, a printer may be selected for the user in one embodiment (step S8 and step S9 are skipped), particularly if there is only one printer capable of all the desired features, or the printer may be automatically selected based on features, speed, and/or queue length. However, in a large organization, there may be some large number or printers on the network (e.g. 80,000) and it may not be clear which printers are located proximate the user. In this case, a printer can be selected based on a network directory service (e.g., Novell NDS), or a determination can be made as to what printer the user selects (e.g. step S8 and S9 are not omitted).

The current PC print model is designer-focused. It is easy for the software designer to limit the user's choices to those available on a single printer. Changing to a customer task focus removes the need for the customer to intimately understand the capabilities of each printer when trying to create printed output.

The concept of a pool of printers where the system selects the actual device to which to print has been around for a long time. However, the selection was made after the user created the print job. Allowing the user flexibility to use printer specific features without having to first select a printer simplifies the user's work.

The protection sought is not to be limited to the disclosed embodiments, which are given by way of example only, but instead is to be limited only by the scope of the appended claims.

What is claimed is:

1. A computer readable medium for use with a computer that has a list of favorite printers, the computer readable medium bearing software configured to, when used with a computer:
   present to a user of the computer an interface with which the user can select from a superset of print features provided by multiple printers;
   receive from the user data indicating print features selected by the user; and
   suggest a printer to the user based on print features selected by the user, wherein the computer has a list of favorite printers and wherein the software is further configured to determine if there is any printer on the list of favorite printers capable of all of the print features selected by the user, prior to suggesting a printer, and, if so, to suggest a printer that is on the list of favorite printers and that is capable of all of the print features selected by the user.

2. A computer readable medium in accordance with claim 1 wherein the software is further configured to suggest a printer to the user based on print speed.

3. A computer readable medium in accordance with claim 1 wherein the software is further configured to receive a selection of a printer from the user after suggesting a printer to the user.

4. A computer readable medium in accordance with claim 1 wherein the computer is selectively coupled to a network and wherein the software is further configured to determine if there is any printer anywhere on the network capable of all of the print features selected by the user if there is no printer on the list of favorite printers having all of the print features selected by the user.

5. A computer readable medium in accordance with claim 4 wherein the software is further configured to, if there is a printer on the network but not on the list of favorite printers that is capable of all of the print features selected by the user, prompt the user as to whether to add that printer to the list of favorite printers.

6. A computer readable medium in accordance with claim 4 wherein the software is further configured to, if there is no printer anywhere on the network capable of all of the print features selected by the user, prompt the user to select a printer.

7. A method of configuring a computer for printing, the method comprising:
   presenting to a user an interface with which the user can select from a superset of print features provided by multiple printers;
   receiving, from the user, data indicating print features selected by the user; and
   suggesting a printer to the user based on print features selected by the user, the suggesting comprising determining if there is any printer frequently used by the user capable of all of the print features selected by the user prior to suggesting a printer, and, if so, suggesting a printer that is on the list of favorite printers and that is capable of all of the print features selected by the user.

8. A method in accordance with claim 7 and further comprising suggesting a printer to the user based on print speed.

9. A method in accordance with claim 7 and further comprising combining description files of multiple printers to define a superset of print features provided by multiple printers.

10. A method in accordance with claim 7 and further comprising combining description files of printers to define a superset of print features provided by all printers on the network.

11. A method in accordance with claim 10 and further comprising receiving a selection of a printer from the user after suggesting printers to the user.

12. A method in accordance with claim 11 and further comprising formatting a print job for printing on the selected printer.

13. A computer configured for use in a network including multiple printers, some of which are commonly used by a user of the computer and contained in a list of commonly used printers stored in the computer, the computer comprising software configured to:

(a) combine description files of printers to define a superset of print features provided by multiple printers on the network;

(b) present to a user an interface with which the user can select from the defined superset of print features provided by multiple printers on the network;

receive from the user data indicating print features selected by the user;

(d) determine if there is any printer commonly used by the user capable of all of the print features selected by the user and, if so, proceed to step (f); and, if not, proceed to step (e);

(e) determine if there is any printer elsewhere in the network capable of all of the print features selected by the user and, if so, proceed to step (f) and, if not, providing a message so indicating to the user;

(f) suggest printers to the user capable of all the print features selected by the user;

(g) receive a selection of a printer from the user; and (h) send a print job for printing on the selected printer.

14. A computer in accordance with claim 13 wherein the software is further configured to, if the selected printer is not in the list of commonly used printers, prompt the user as to whether to add the selected printer to the list of commonly used printers.

15. A computer in accordance with claim 13 wherein the software is further configured to, if there is a printer elsewhere in the network capable of all of the print features selected by the user, allow the user to add that printer to the list of commonly used printers.

* * * * *